3,578,531
MANDREL
Dominique Carlini, Rousset, France, assignor to Recherches et Applications des Plastiques dans l'Industrie et le Batiment, S.A., Rousset, France
Filed Apr. 25, 1968, Ser. No. 723,986
Claims priority, application France, Aug. 17, 1967, 118,049
Int. Cl. B65h *67/00, 81/00, 81/02*
U.S. Cl. 156—425                                                                 10 Claims

ABSTRACT OF THE DISCLOSURE

A cylindrical mandrel comprised of a plurality of segments, the arc transcribed by each segment being adjustable to vary the circumference of the mandrel. The mandrel segments comprise frame members which support, from the center thereof, flexible rectangular blanks and means are provided for adjusting the bending of the blanks.

BACKGROUND OF THE INVENTION

(1) Field of the invention

The present invention relates to mandrels. More particularly, the present invention is directed to a cylindrical, segmented mandrel having an adjustable circumference. Accordingly, the general objects of the present invention are to provide novel and improved apparatus of such character.

(2) Description of the prior art

While not limited thereto in its utility, the mandrel of the present invention is particularly well suited to employment in the manufacture of cylindrical tubes of reinforced plastic. Such tubes may, for example, be fabricated by the winding onto the mandrel of a glass fiber fabric which has been impregnated with a polyester resin to which has been added a catalyst.

In the prior art, it has been difficult, if not impossible, to manufacture on site tanks of reinforced plastic material having a substantial diameter and/or height. The problems associated with prior art attempts to manufacture tanks of reinforced plastic of a size too large to be transportable are several. Among the more substantial of these problems has been the lack of mandrels of substantial size which may be readily erected on site. Additional problems have resulted from the fact that, in the course of the polymerization of the resin, the fabric material will tighten about the mandrel. Thus, in addition to being easily assembled on site, it becomes necessary that mandrels characterized by adjustable circumference be provided so that mandrel diameter may be reduced in order to remove the material wound thereon. Prior art mandrels have not been so constituted.

SUMMARY OF THE INVENTION

The present invention overcomes the above-discussed and other disadvantages of the prior art by providing a novel mandrel.

Accordingly, one of the objects of the present invention is the provision of a mandrel which may be readily transported and which may be erected at any required site.

It is another object of the present invention to provide a cylindrical mandrel comprised of juxtapositionable segments and having a variable diameter.

The mandrel in accordance with the present invention is designed to allow the manufacture of cylindrical tubes of reinforced plastic by the winding of sheets or nets of glass fiber impregnated with polymerizable plastic onto the external lateral mandrel surface. The mandrel consists of a series of vertical juxtapositionable elements, each element comprising a flexible sheet blank of generally rectangular form. The flexible blanks are supported along a line situated equally from their two vertical edges from a frame. The supporting frame comprises means for engaging blades or sectors extending inwardly from the edges of the blanks whereby the arcs defined by the blanks may be modified. The mandrel also comprises means for adjustably connecting the frames from one segment to the next, the adjustable connecting means permitting reduction of the mandrel circumference.

In accordance with a preferred embodiment of the invention, the supporting means for the flexible blanks may be constituted of first rectangular metal frames, each of the first rectangular metal frames in turn being integral with and supporting a second rectangular frame which extends perpendicularly therefrom. The flexible sheet blanks are fixed to a vertical side of the second frames along a line which is equally distant from the sides of the blank.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which.

DESCRIPTION OF THE PREFERRED EMBODIMENT

Figure 1:
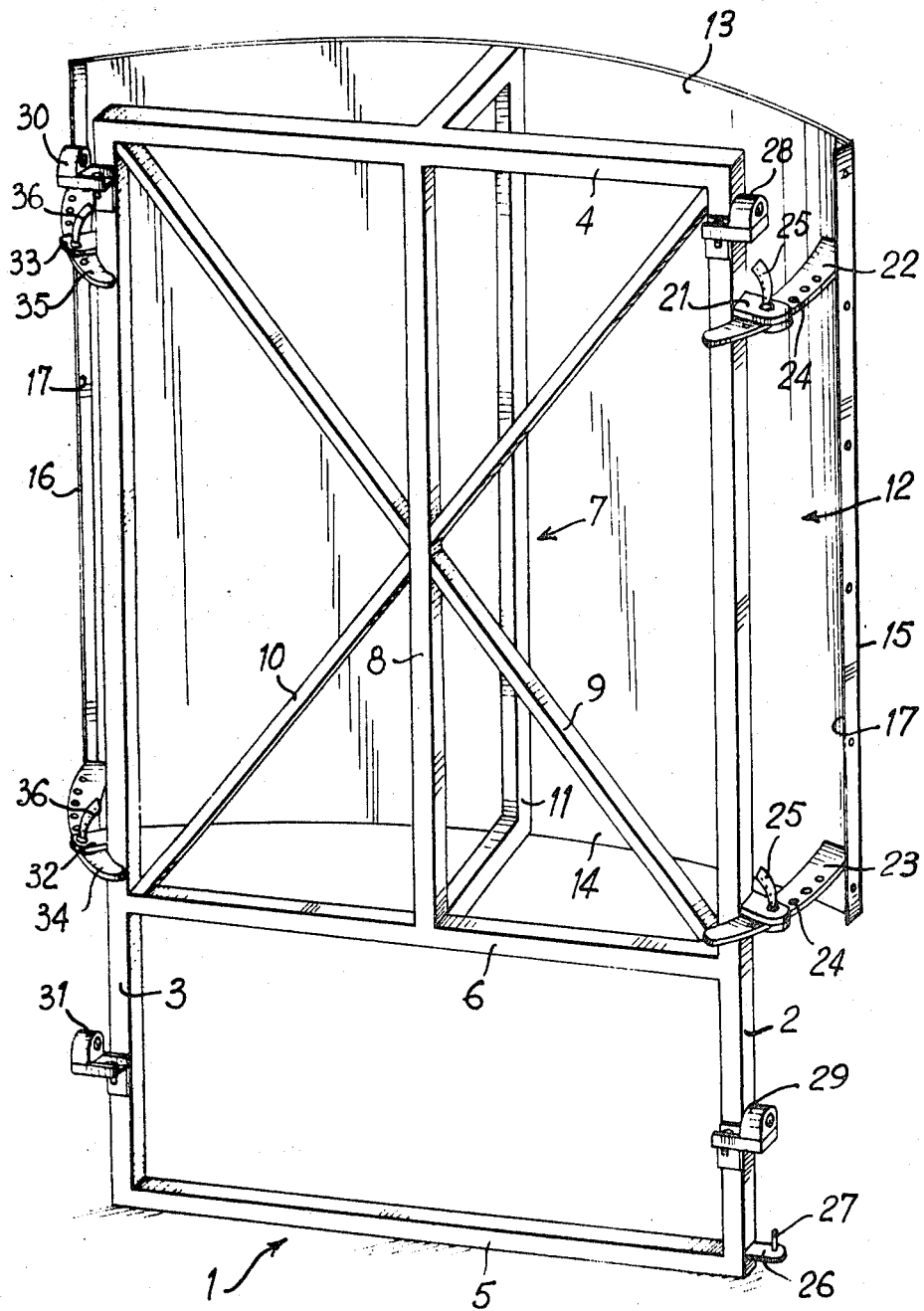
FIG. 1 is a perspective view of a segment of a preferred embodiment of a mandrel in accordance with the present invention.

With reference now to FIG. 1, a single segment of the mandrel of the present invention is shown. The segment of FIG. 1 comprises a metal frame 1 of generally rectangular form, the frame comprising two parallel vertical side members 2 and 3 and parallel top and bottom members 4 and 5. The members comprising frame 1 are preferably formed from conventional T-sections.

The frame 1 also comprises an intermediate member 6 which is parallel to the top and bottom members 4 and 5, member 6 being welded at its opposite ends to the side members 2 and 3.

A second rectangular frame 7, extending in a plane perpendicular to the plane defined by frame 1, is affixed to frame 1 by welding one of its vertical side members 8 to top member 4 and intermediate member 6 of the frame 1. Diagonal bracing bars, such as bars 9 and 10, extend between the side members 2 and 3 of the frame 1 and will be joined to vertical member 8 of frame 7, for example by welding.

A flexible metal blank 12 is welded to the second vertical member 11 of frame 7. Flexible metal blank 12 is rectangular in shape and has top and bottom edges 13 and 14, respectively, and vertical side edges 15 and 16. The side edges 15 and 16 of blank 12 are braced by L-sections 17. The blank 12 is joined to vertical member 11 of frame 7 in such a manner that member 11 is precisely perpendicular to the bottom and top edges 14 and 13 and exactly intermediate of the side edges 15 and 16 thereof.

Forks 20 and 21 are suitably attached to vertical side member 2 of frame 1. Sectors 22 and 23, each sector being provided with a plurality of holes 24, extend inwardly from blank 12. The sectors 22 and 23 respectively slide between the blades of forks 21 and 20, the blades of the forks also having a hole therethrough so as to allow the insertion of pins 25 through the forks and sectors.

Adjacent the bottom end thereof, vertical side member 2 is provided with a lug 26 from which projects a vertical nipple 27. Adjacent its top end, vertical side member 2 is provided with a fastener assembly comprising a nut 28 which pivots about a vertical axis. A second nut 29, which also pivots about a vertical axis, is affixed to member 2 intermediate its points of intersection with bottom member 5 and intermediate member 6.

Vertical side member 3 is arranged with accessories in an identical manner as is side member 2 and thus has mounted thereon nuts 30 and 31 which are adapted to pivot about vertical axis and forks 32 and 33 which respectively receive perforated sector members 34 and 35. Sectors 34 and 35 respectively slide in forks 32 and 33 and pins 36 may be inserted through the forks and selected holes of the sectors.

It is to be noted that the span between vertical sides 15 and 16 of blank 12 is a multiple of $\pi$ so that it is possible, simply by juxtapositioning of a plurality of the mandrel segments of FIG. 1, to achieve a perfect circumference.

Figure 2:
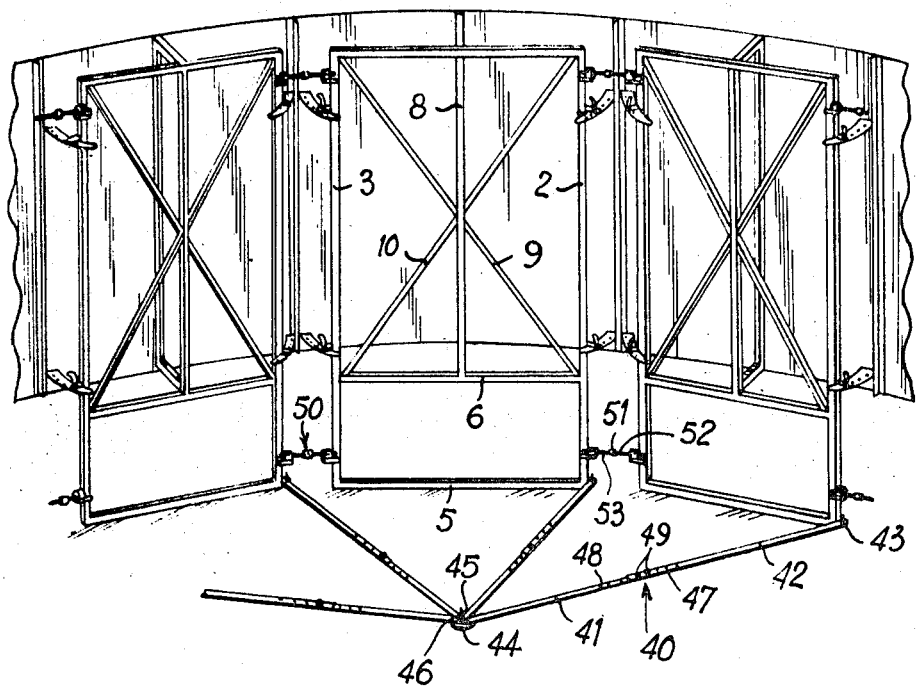
FIG. 2 is a perspective view of a portion of a mandrel in accordance with the present invention, FIG. 2 depicting a plurality of segments joined together.

Referring now to FIG. 2, in the erection of the mandrel steps must be taken to insure that each segment is positioned at an equal distance from the center of the circle it is desired to have the mandrel define. Accordingly, bars, such as bar 40, are provided. Each of bars 40 consists of lengths 41 and 42 provided respectively with holes 47 and 48 into which bolts 49 may be selectively inserted. The length 42 presents, at its free end, a hole 43 which is adapted for engagement with the vertical nipple 27 (FIG. 1) extending from member 2 of frame 1. The length 41 is provided, at its free end, with a hole 46 which is designed to fit onto a nipple 45 of a plate 44 which rests upon the ground.

The length of each of bars 40 can easily be varied as a function of the radius of the mandrel to be erected by superimposing the lengths 41 and 42 and fixing them one to the other by passing bolts 49 through the holes 47 and 48.

The pivotable nuts 28 and 29 will have the same pitch while the pivotable nuts 30 and 31, while also having the same pitch, will be oppositely threaded with respect to nuts 28 and 29. Accordingly, in erecting the mandrel, the nuts 28 and 29 of a first segment may be respectively joined to the nuts 30 and 31 of a next segment by means of a threaded rod.

Figure 3:
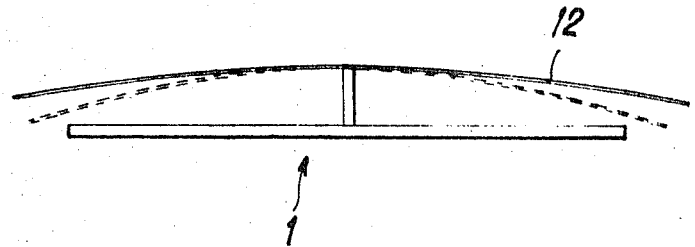
FIG. 3 is a top plan view, with parts eliminated in the interest of clarity, of the mandrel segment of FIG. 1.

As will be obvious from FIG. 3, the radius of curvature of the blanks 12 can be readily varied by shifting the sectors 22, 23, 34 and 35 in their respective forks and by locking the said sectors in the appropriate position by insertion of pins in the corresponding holes provided in the sectors.

The erection of the mandrel in accordance with the present invention is as follows:

Initially, the circumference of the tank which is to be fabricated is chosen. Thereafter, as a function of tank circumference, pins 25 and 36 are inserted through the forks and desired holes in the sectors in such a manner that the sector lengths and thus the radii of curvature of each blank 12 of each segment is adjusted so as to cause each blank to present an arc of the desired circumference.

Next, the mandrel segments are juxtapositioned and are assembled by joining the pivotable nuts adjacent the top and bottom of each vertical frame member to the nuts on the adjacent frame member by means of threaded rods 50. The threaded rods may present, at a point intermediate their length, a hexagon 51 with bolt portions 52 and 53 of opposite pitch extending to either side thereof. The bolt portions 53 screw into the nuts 28 and 29 and the bolt portions 52 screw into the nuts 30 and 31.

In order to insure the desired circumference, the plate 44 is set at the desired centerpoint of the tank. The length of the bars 40 will have been previously adjusted as a function of the circumference to be accomplished. The bars 40 are positioned by engaging the hole 43 on a nipple 27 and the hole 46 on nipple 45 of plate 44. When three or four bars 40 have been placed, that is after three or four mandrel segments have been assembled, the exact center of the mandrel will, of course, have been established.

If it is desired to manufacture a mandrel of large diameter, the blanks 12 will be bent only a little and a large number of mandrel sections will be employed. If, on the other hand, it is desired to obtain a mandrel of small diameter, the number of sections will be smaller and the bending of the blanks 12 will be more pronounced. Thus, the circumference of the mandrel can be infinitely varied, the minimum variation corresponding to the elimination of one element.

While not limited thereto in its utility, the present invention is particularly well suited for the manufacture of cylindrical tanks with apparatus such as that described in copending application Ser. No. 720,710, filed Apr. 11, 1968 in the name of the present applicant. In copending application Ser. No. 720,710, the mandrel is wrapped with thicknesses of fabric impregnated with polymerizable resin, these thicknesses being subsequently moved vertically upwards to continue the wall of the cylindrical tank to its desired height. In view of the fact that the thicknesses of impregnated fabric are wrapped tightly around the mandrel, and that in the course of the polymerization of the resin a further tightening of the thicknesses on the mandrel takes place, it would not be possible to slide the tank sections vertically off the mandrel if the circumference of the mandrel could not be reduced. When the mandrel of the present invention is assembled, the edges 15 and 16 of adjacent blanks 12 will not be in contact. Thus, by providing a gap between the edges 15 and 16 of adjacent mandrel segments, the circumference of the mandrel may be reduced by rotating rods 50 with a suitable tool thereby bringing the edges 15 and 16 closer together. Thereafter, when the tank section has been raised, the mandrel may be returned to its original circumference and another tank section manufactured.

When a tank has been completed, the mandrel of the present invention will be dismantled and the elements thereof withdrawn either through the top of the as yet unclosed tank or withdrawn underneath the bottom edge of the tank which may be maintained in a raised position during the dismantling of the mandrel.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:
1. A mandrel segment comprising:
   support means including a first rectangular metal frame adapted to rest on the ground;
   a flexible sheet of material, said sheet being generally rectangular in form;
   means including a second rectangular metal frame for mounting said flexible sheet from said support means, said second frame extending from said first frame in a plane perpendicular to the plane defined by said first frame, said flexible sheet being fixed to the extending side of said second frame which is parallel to the plane of the first frame, said mounting means engaging said sheet intermediate its edges; and
   means extending between said support means and said flexible sheet for varying the configuration of an arc defined by said sheet.
2. The apparatus of claim 1 wherein said arc varying means comprises:
   sector means extending inwardly from the oppositely disposed vertical sides of said flexible sheet; and
   means mounted on said first frame for selectively engaging said sector means.

3. The apparatus of claim 2 further comprising:
first fastener means pivotably connected to said first frame; and
adjustable means for engaging a similar fastener means on an adjacent segment, said engaging means also engaging said first fastener means, adjustment of said engaging means drawing adjacent segments together or forcing adjacent segments apart.

4. The apparatus of claim 3 further comprising:
means for initially selecting the arc to be defined by said flexible sheet.

5. The apparatus of claim 4 wherein said selecting means comprises:
a bar of adjustable length;
plate means adapted to engage a first end of said bar, said plate means being situated at the desired center of the arcuate sheet; and
means fixed to the base of said first frame for engaging the other end of said adjustable bar.

6. A mandrel segment comprising:
support means having a frame;
a flexible sheet of material, said sheet being generally rectangular in form;
means for mounting said flexible sheet from said support means, said mounting means engaging said sheet intermediate its edges;
blade means extending from the opposite edges of said flexible sheet; and
means connected to the frame of said support means for adjustably engaging said blade means to vary the configuration of the flexible sheet mounted from said support means.

7. A mandrel segment comprising:
support means including a structural frame;
a flexible sheet of material, said sheet being generally rectangular in form;
means for mounting said flexible sheet from said support means, said mounting means engaging said sheet intermediate its edges;
means extending between said support means and said flexible sheet for varying the configuration of the sheet mounted from the support means;
fastener means pivotally connected to said support means; and
means for adjustably engaging an adjacent mandrel segment and said fastener means, adjustment of said engaging means drawing adjacent segments together or forcing adjacent segments apart.

8. A mandrel segment comprising:
support means;
a flexible sheet of material, said sheet being generally rectangular in form;
means for mounting said flexible sheet from said support means, said mounting means engaging said sheet intermediate its edges;
means extending between said support means and said flexible sheet for varying the configuration of the flexible sheet mounted to said support means; and
means for initially selecting an arcuate configuration to be defined by said flexible sheet, said selecting means including:
a bar of adjustable length;
plate means adapted to engage a first end of said bar, said plate means being situated at the desired center of the arcuate sheet; and
means fixed to the base of said support means for engaging the other end of said adjustable bar.

9. A mandrel segment comprising:
support means;
a sheet of flexible material having a generally rectangular shape;
means for mounting said sheet from said support means, said mounting means engaging said sheet intermediate opposite and generally parallel edges of the sheet;
blade means extending from the opposite parallel edges of the sheet;
means carried by said support means and adjustably engaging said blade means for varying the curvature of said sheet in an arcuate configuration;
fastener means pivotally connected to said support means; and
means for adjustably engaging an adjacent segment and said fastener means, adjustment of said engaging means moving adjacent segments together or apart.

10. A mandrel segment according to claim 9 further comprising:
a bar of adjustable length;
a plate means adapted to engage one end of said bar, said plate means being situated at the desired center of the arcuate flexible sheet; and
means fixed to the base of said support means for engaging the other end of said adjustable bar.

References Cited
UNITED STATES PATENTS

| | | | |
|---|---|---|---|
| 626,054 | 5/1899 | Clark | 249—152 |
| 720,371 | 2/1903 | Mansan | 249—152 |
| 977,763 | 12/1910 | Tufts | 249—152X |
| 1,001,500 | 8/1911 | Blaney | 249—152X |
| 1,008,264 | 11/1911 | Hill | 249—152X |
| 1,353,813 | 9/1920 | Hughes | 249—152X |
| 2,834,088 | 5/1958 | Miller | 25—121X |

BENJAMIN A. BORCHELT, Primary Examiner

T. H. WEBB, Assistant Examiner

U.S. Cl. X.R.

156—431